United States Patent [19]
Katzeff et al.

[11] Patent Number: 4,760,395
[45] Date of Patent: Jul. 26, 1988

[54] ARRANGEMENT FOR COMMUNICATIONS BETWEEN EQUIPMENT BELONGING TO DIFFERENT NETWORK ARCHITECTURES

[76] Inventors: Kurt Katzeff; Bengt Åkesson, both of Televerket, S-123 86 Farsta, Sweden

[21] Appl. No.: 881,359
[22] PCT Filed: Oct. 23, 1984
[86] PCT No.: PCT/SE84/00351
§ 371 Date: Jun. 20, 1986
§ 102(e) Date: Jun. 20, 1986
[87] PCT Pub. No.: WO86/02749
PCT Pub. Date: May 9, 1986
[51] Int. Cl.$^4$ .................. H04Q 9/00; H04L 11/00
[52] U.S. Cl. .................. 340/825.03; 178/3; 370/60
[58] Field of Search .......... 340/825.03; 178/3; 370/56, 58, 79, 60, 85

[56] References Cited
U.S. PATENT DOCUMENTS

| | | | |
|---|---|---|---|
| 4,323,728 | 4/1982 | Bergman et al. | 178/3 |
| 4,466,063 | 8/1984 | Segarra et al. | 364/200 |
| 4,525,830 | 6/1985 | Cohen et al. | 370/56 |
| 4,597,074 | 6/1986 | Demichelis et al. | 370/58 |

OTHER PUBLICATIONS

Paul Guinaudeau, *The International Packet Switching Services in France*, IEEE Conference: 1981 International Conference on Communications, Denver, Colo., USA (Jun. 14–18, 1981), S1792-0113.
EP 0125773-A2, J. P. DeVita, et al, Nov. 21, 1984.

*Primary Examiner*—Donald J. Yusko
*Attorney, Agent, or Firm*—Pollock, Vande Sande & Priddy

[57] ABSTRACT

A communications network (K) provides the integration of at least two networks with different network architectures, (SNA, DCNA, DECNET). The communications network as such exhibits its own specific network architecture (ICNA) independent of the aforementioned architectures. To the selector system (V) of the network are connected pieces of conversion equipment (CEI, CDI, CSI, CIE, CIS, CID). Pieces of equipment for different network architectures are capable of being linked via the aforementioned pieces of conversion equipment. Connections between equipment belonging to the specific network architecture (ICNA) and a second network architecture are routed via a piece of conversion equipment and connections between equipment belonging to two other network architectures are routed via two pieces of conversion equipment wired in series.

5 Claims, 2 Drawing Sheets

ARRANGEMENT FOR COMMUNICATIONS BETWEEN EQUIPMENT BELONGING TO DIFFERENT NETWORK ARCHITECTURES

The present invention relates to an arrangement permitting communication between pieces of equipment in a communications network, for example an integrated network for data, telephony, text and/or images. The aforementioned communications network is also of the kind which, in principle, provides the integration of at least two networks with different network architectures. The aforementioned communications network is constructed with its own specific network architecture independent of the architectures of the aforementioned two networks. There are connected to a selector system of the communications network pieces of conversion equipment through which connections between pieces of equipment for different network architectures are capable of being linked.

DESCRIPTION OF THE PRIOR ART

The different companies which market different pieces of equipment on the open market, for example computers and terminals, etc., and their associated communications systems, stipulate the use of designs specific to that particular company, which means that the system of one company will not, as a general rule, be compatible with the system of another company. The following may be mentioned as examples of previously disclosed systems: SNA (System Network Architecture), DCNA (Distributed Communication Network Architecture), and DECNET (Digital Equipment Computer Network).

DESCRIPTION OF THE PRESENT INVENTION

Technical Problem

There is a general wish for the expansion of data communications networks of the type in question, to which connection is possible and in which communication can be provided between the pieces of equipment which are specific to the different companies. This presupposes, amongst other things, the use of conversion equipment, and it is desirable in this respect that the designs of the components concerned should be simple, and that the range of components should be kept to a minimum.

Solution

One of the objects of the present invention is to solve the problem outlined above, and what may be regarded in this respect as being essentially characteristic of the novel arrangement is that connections between pieces of equipment belonging to the specific architecture, that is to say the architecture of the communications network, and a second network architecture are routed via a piece of conversion equipment, and the connections between pieces of equipment belonging to two other network architectures are routed via two pieces of conversion equipment wired in series.

In further developments of the idea of invention it is proposed that the first pieces of conversion equipment should be so arranged as to be utilized for the conversion of link protocol between equipment in the specific network architecture (i.e. that of the communications network) and equipment in each of the aforementioned other network architectures, and that the other pieces of conversion equipment should be so arranged as to be wired in series with the aforementioned first pieces of conversion equipment for the purpose of the convention of link protocol between equipment belonging to two of the aforementioned other network architectures.

Advantages

The solution proposed above will permit the number of pieces of conversion equipment to be kept to a minimum, at the same time as a comparatively simple design can be retained for each of the pieces of conversion equipment.

DESCRIPTION OF THE DRAWINGS

A preferred embodiment of an arrangement which exhibits the significant characteristic features of the invention is described below with reference to the accompanying drawing.

DESCRIPTION OF THE PREFERRED EMBODIMENT

Figure 1:
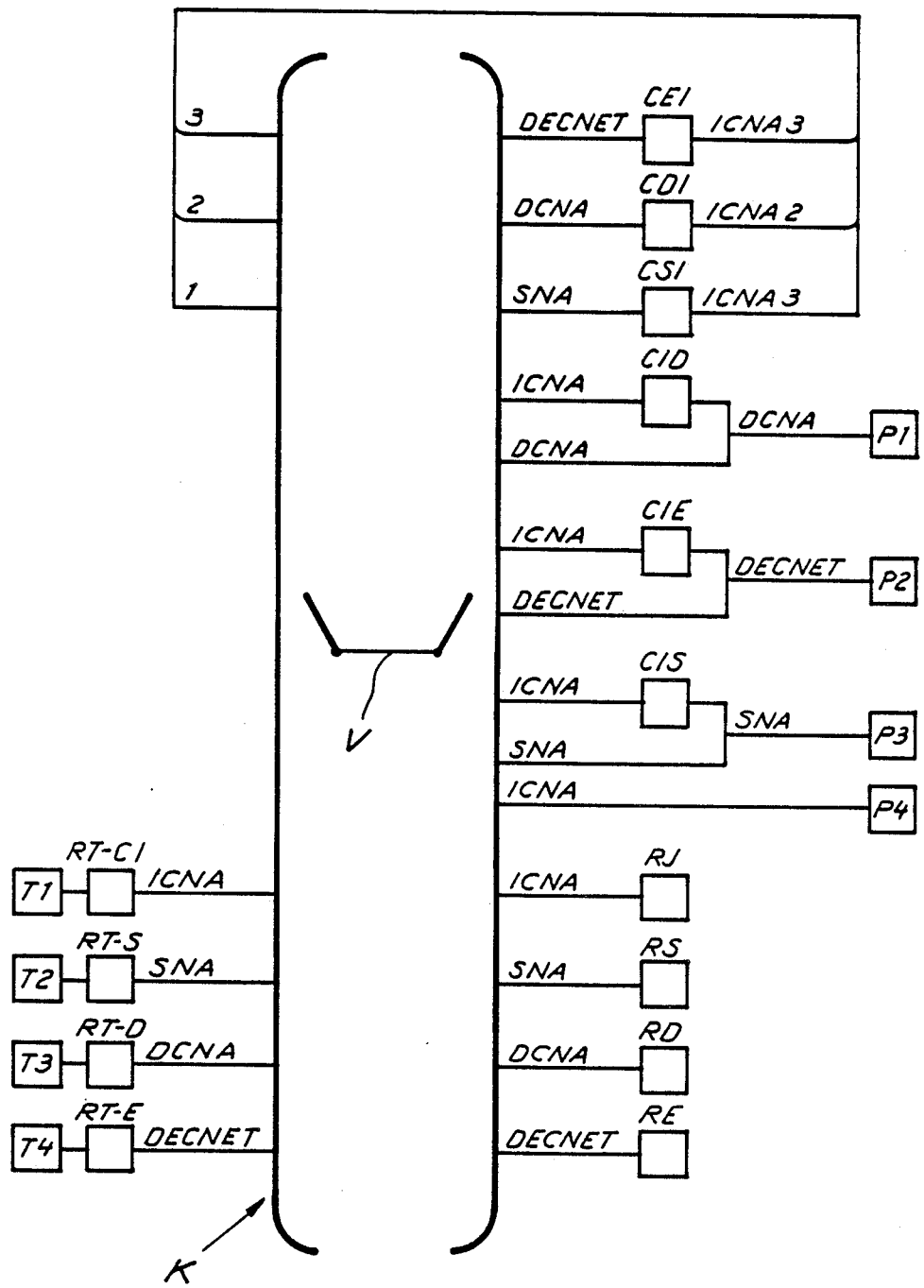
FIG. 1 shows in the form of a block diagram the basic design of a communications network having, amongst other things, terminals, processors and path selection equipment.

A communications network, for instance an integrated network for data, telephony, text and/or images, is indicated by K in FIG. 1. The design of the network may be of a previously disclosed type and will accordingly not be described here in detail, but is shown only in principle by means of a selector symbol V and inputs and outputs in the network.

A number of terminals T1, T2, T3, T4 are connected to the network via storage devices RT-CI, RT-S, RT-D and RT-E for the purpose of determining the path selection in the network. To the network are also connected host computers or processors P1, P2, P3 and P4, these designations being able to represent not only the processors but also mail boxes, text conference equipment, and connection equipment to other networks, etc. The aforementioned pieces of equipment can also include multiplexers and concentrators. Each of the terminals T1–T4 shall be capable of being linked to the aforementioned pieces of equipment P1–P4 for the purpose of performing different operating tasks. In this respect the host computers are able to perform different operating tasks. Two or more computers can, of course, perform the same operating task, should the need for the operating task in question to be performed exist within the network. Each of the terminals is thus capable of being connected to one or more computers via the network.

In accordance with the invention, the illustrated design includes pieces of specific path selection equipment RJ, RS, RD and RE, to which the terminals are automatically connected via the network when they are activated. The pieces of path selection equipment are connected to outputs of the selection network V in accordance with FIG. 1, but may, as an alternative or in addition, be arranged inside or adjacent to one or more of the pieces of equipment P1–P4. The latter case will be of interest, for example, when a terminal is used almost exclusively with a single processor, which is provided in this way with a piece of path selection equipment of this kind.

In the embodiment shown, use is made of a network which provides the integration of networks with a number, in this case three, of different network architectures. Terminals, processors and path selection equipment are provided in this case for each of the network architectures, and also for the integrated network as such.

The terminal T1, the storage device RT-CI for path selection information, the path selection equipment RJ and the processor P4 are matched to the overall integrated network architecture, referred to here as ICNA, which is the preferred designation for the Integrated Communications Network Architecture used by the Swedish Telecommunications Administration. T2, RT-S, RS and P3 are matched to a network architecture in accordance with SNA (System Network Architecture), which constitutes a first network architecture developed for a company. T3, RT-D, RD and P1 are contained in the DCNA (Distributed Communication Network Architecture) network architecture, which constitutes a second network architecture developed for a company. T4, RT-E, RE and P2 are contained in the DECNET (Digital Equipment Computer Network) network architecture, which constitutes a third network architecture developed for a company.

In order to permit communication between terminals and processors of different architectures, the network design includes CIS conversion equipment, which is conversion equipment between ICNA and SNA. Similarly, CIE is conversion equipment between ICNA and DECNET, CID between ICNA and DCNA, CSI between SNA and ICNA (which can be the same as CIS), CEI between DECNET and ICNA (which can be the same as CIE), and CDI between DCNA and ICNA (which can be the same as CID).

The aforementioned architectures SNA, DCNA and DECNET represent at the present time the most common network architectures and link protocols. ICNA overlaps all three of the aforementioned architectures and presupposes the use of Open System Interconnect (OSI), on condition that OSI has been defined.

When one terminal of the aforementioned terminals T1-T4 is occupied or is activated, it will be connected automatically to the path selection equipment RJ, RS, RD or RE, of the group or architecture to which it belongs. The operator initiates his work at the terminal by indicating the designation of the task which he wishes to perform. The path selection equipment translates the name of the task into path selection information which is transmitted back to the storage device of the terminal, that is to say to one of the pieces of path selection equipment RT-CI, RT-S, RT-D or RT-E. The storage equipment for the terminal concerned controls the establishment of the connection to that processor which is able to perform the task.

Each piece of path selection equipment may conveniently also be so arranged as to provide automatic switching over from one computer which is already linked to another computer. This may be of interest if the operating task at the terminal changes, and if it is wished to have performed another type of work which the computer concerned is unable to execute. Another reason for the aforementioned switching over is that the computer concerned may be required to perform a task of higher priority than that with which it is involved at the time.

In a preferred embodiment one or more terminals are designed in such a way that each terminal for each computer and/or each piece of path selection equipment is able to transmit a code which describes the characteristics and design of the terminal, for example the key arrangement, graphics, capabilities, colour, and print-out capabilities, etc. The path selection equipment is able in a preferred embodiment to take into account the aforementioned terminal characteristics when selecting the computer. The path selection equipment notifies the terminal of any restrictions on the use of the terminal for the desired task. The path selection equipment can also notify the terminals of the type of terminal which should be used if complete processing of the task is desired. The aforementioned information can also be provided by the computer if information relating to the type of terminal is transmitted further to the computer.

Different instances of link protocol conversion may occur in accordance with the above. If the terminal and the processor are matched to the same architecture and link protocol, no conversion equipment will be required. One piece of conversion equipment will be required if either the processor or the terminal is not matched to ICNA. If neither the terminal nor the processor is matched to ICNA, then two pieces of conversion equipment will require to be linked in series via the network. The connection between the ICNA terminal T1 and the SNA processor P3 is routed via the selector network V and the conversion equipment CIS. Similarly, T1 is connected to P1 and P2 via CID and CIE respectively. The connection between, for example, SNA terminal T2 and the DCNA processor P1 is routed via the selector network V, the conversion equipment CSI, the fixed connection 1, once more through the selector network, and the conversion equipment CID. T2 communicates with P2 via V, CDI, the connection 2, V and CIE, and so on.

The Table below shows the occasions when the different pieces of conversion equipment are required.

|  | Processor: | | | |
| --- | --- | --- | --- | --- |
|  | INCA | SNA | DCNA | DECNET |
| Terminal | | | | |
| ICNA | None | CIS | CID | CIE |
| SNA | CSI | None | CSI-CID | CSI-CIE |
| DCNA | CDI | CDI-CIS | None | CDI-CIE |
| DECNET | CEI | CEI-CIS | CEI-CID | None |

Figure 2:
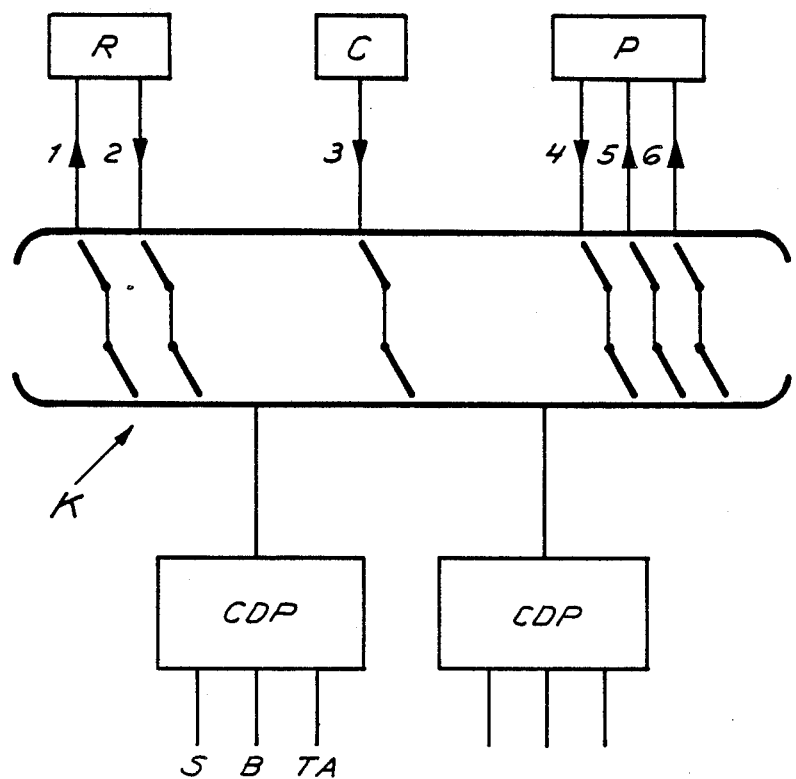
FIG. 2 shows in the form of a block diagram the basic design of the central monitoring organs in the network in accordance with FIG. 1.

The concept for the equipment illustrated contains functions for the control, monitoring and administration of the network, which is shown clearly in FIG. 2. The pieces of path selection equipment connected to the network K in FIG. 1 are indicated in FIG. 2 by the designation R. The pieces of conversion equipment and the processors in accordance with FIG. 1 are included in a similar fashion in FIG. 2 and are indicated respectively by the designations C and P. The central monitoring organs in the network are symbolized by CDP (Central Monitoring Processors). Control paths 1-6 are indicated by arrows. The arrow 1 indicates the possibility for changing the path selection information, the blocking of certain traffic and/or the allocation of priority to certain traffic via the pieces of equipment R. The arrow 2 indicates availability information and/or traffic statistics from the path selection equipment. The arrow 3 indicates availability information and/or traffic statistics from the conversion equipment, whereas the arrow 4 indicates corresponding information or statistics from the processors P. The processors can also be controlled so as to allocate priority to certain traffic, as indicated by the arrow 5. The interruption of certain connections, for example those with low priority, can also be controlled; see the arrow 6.

The central monitoring processors may be of a previously disclosed type and may include connections for a printer S, a screen B and a keyboard TA, etc.

Changes to traffic path information shall be capable of being made from appropriate central points in the network, cf. CDP, which will arrive at the pieces of path selection equipment R via separate selectors. The terminals and the operators must identify themselves to the path selection equipment R so that the latter can select a path or, if necessary, block traffic on the basis of its origin. Processors and pieces of conversion equipment shall meter their traffic continuously and shall notify blocking situations to the central monitoring points of the network, which in turn control the operation of the path selection equipment. The path selection equipment shall be able to communicate with the central monitoring points of the network and shall notify any communication requirements which cannot be executed. The possibility shall be afforded of interrupted connections of low priority via the processors from a central point in the network, should the information from the path selection equipment so require.

The invention is not restricted to the embodiment described above by way of example, but may undergo modifications within the context of the following patent claims and the idea of invention.

We claim:

1. An arrangement for enabling communication between any two pieces of equipment, such as terminals and processors, in a communications network comprising one specific network architecture (ICNA), said pieces of equipment having a network architecture of either said specific network architecture (ICNA) or another network architecture within a group of at least two different network architectures (SNA, DCNA, DECNET), said communications network including:
    selector means for establishing connections between various pieces of equipment (V),
    conversion equipment (CEI, CDI, CSI, CID, CIE) and path selection equipment (RJ, RS, RD, RE), both said conversion equipment and path selection equipment being connected to the selector means,
    first means for establishing a connection between pieces of equipment having the same network architecture via the selector means without any conversion equipment,
    second means for establishing a connection between pieces of equipment, a first one of which having the specific network architecture (ICNA) and a second having a second network architecture (SNA, DCNA, or DECNET), said second means establishing said connection via the selector means and a single piece of conversion equipment (e.g. CID), and
    third means for establishing a connection between pieces of equipment having two different network architectures, other than the specific network architecture (SNA, DCNA, DENET, etc.), said third means establishing said connection successively via the selector means, a first piece of conversion equipment, the selector means again and a second piece of conversion equipment (CSI, CID).

2. A method of enabling communication between any two pieces of equipment, such as terminals and processors, in a communications network comprising one specific network architecture (ICNA), said pieces of equipment having a network architecture of either said specific network architecture (ICNA) or another network architecture within a group of at least two different network architectures (SNA, DCNA, DECNET), said communications network including selector means for establishing connections between various pieces of equipment (V), conversion equipment (CEI, CDI, CSI, CID, CIE) and path selection equipment (RJ, RS, RD, RE), both said conversion equipment and path selection equipment being connected to the selector means, said method comprising:
    (a) identifying said two pieces of equipment to be connected and their associated network architectures, and thereafter:
    (b1) establishing a connection between pieces of equipment having the same network architecture via the selector means without any conversion equipment,
    (b2) establishing a connection between pieces of equipment, a first one of which having the specific network architecture (ICNA) and a second having a second network architecture (SNA, DCNA, or DECNET) said second means establishing said connection via the selector means and a single piece of conversion equipment (e.g. CID), and
    (b3) establishing a connection between pieces of equipment having two different network architectures, other than the specific network architecture (SNA, DCNA, DECNET, etc.), said third means establishing said connection successively via the selector means, a first piece of conversion equipment, the selector means again and a second piece of conversion equipment (CSI, CID).

3. A method as recited in claim 2 which comprises, prior to performing said step (a) the steps of:
    (i) connecting piece of processor equipment with architectures other than said specific architecture to said selector means via a connection network, said connection network having a node directly connected to the piece of processor equipment and two parallel branches coupled to said selector means, one of said branches including essentially only a conductor and the other branch including a piece of conversion equipment for converting signals associated with said specific architecture to the architecture associated with said piece of processor equipment, and
    (ii) connecting a plurality of pieces of different conversion equipment to said selector means, each said piece of conversion equipment with an input from said selector means and an output to said selector means.

4. A method of enabling communication between two pieces of equipment, such as terminal and processors, in a communications network comprising one specific network architecture (ICNA), said pieces of equipment having different network architectures selected from a group of network architectures all of which are different from said specific network architecture (SNA, DCNA, DECNET), said communications network including selector means for establishing connections between various pieces of equipment (V), conversion equipment (CEI, CDI, CSI, CID, CIE) and path selection equipment (RJ, RS, RD, RE), both said conversion equipment and path selection equipment being connected to the selector means, said method comprising:
  (a) identifying said two pieces of equipment to be connected and their associated network architectures, and
  (b) establishing a connection between said two pieces of equipment successively via the selector means, a first piece of conversion equipment, the selector means again and a second piece of conversion equipment (CSI, CID).

5. A method as recited in claim 4 which comprises, prior to performing said step (a) the steps of:
  (i) connecting pieces of processor equipment with architectures other than said specific architecture to said selector means via a connection network, said connection network having a node directly connected to the piece of processor equipment and two parallel branches coupled to said selector means, one of said branches including essentially only a conductor and the other branch including a piece of conversion equipment for converting signals associated with said specific architecture to the architecture associated with said piece of processor equipment, and
  (ii) connecting a plurality of pieces of different conversion equipment to said selector means, each said piece of conversion equipment with an input from said selector means and an output to said selector means.

* * * * *